United States Patent
Bayesteh et al.

(10) Patent No.: US 10,432,252 B2
(45) Date of Patent: Oct. 1, 2019

(54) METHODS AND APPARATUS FOR SIGNAL SPREADING AND MULTIPLEXING

(71) Applicant: Huawei Technologies Co., Ltd., Shenzhen (CN)

(72) Inventors: Alireza Bayesteh, Ottawa (CA); Mahmoud Taherzadeh Boroujeni, San Diego, CA (US); Mohammadhadi Baligh, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/123,895

(22) Filed: Sep. 6, 2018

(65) Prior Publication Data

US 2019/0007092 A1  Jan. 3, 2019

Related U.S. Application Data

(63) Continuation of application No. PCT/CN2017/080098, filed on Apr. 11, 2017.
(Continued)

(51) Int. Cl.
*H04L 1/00* (2006.01)
*H04B 1/7105* (2011.01)
(Continued)

(52) U.S. Cl.
CPC .......... *H04B 1/71057* (2013.01); *H04B 1/69* (2013.01); *H04L 1/00* (2013.01); *H04L 1/0041* (2013.01); *H04L 1/0042* (2013.01); *H04L 1/0043* (2013.01); *H04L 1/0054* (2013.01); *H04L 1/0056* (2013.01); *H04L 27/3405* (2013.01); *H04B 2201/7097* (2013.01); *H04B 2201/70716* (2013.01)

(58) Field of Classification Search
CPC ... H04L 1/0041; H04L 1/0042; H04L 1/0043; H04L 1/0054; H04L 1/0056; H04L 27/3405; H04L 27/2627; H04L 65/607; H04L 1/0057; H04L 27/36; H04B 2201/70716; H04B 2201/7097
USPC ..... 375/146, 240.24, 240.27, 261, 264, 273, 375/286
See application file for complete search history.

(56) References Cited

U.S. PATENT DOCUMENTS

| 6,934,317 B1 * | 8/2005 | Dent | ..................... H04L 1/0003 375/140 |
| 9,654,253 B1 * | 5/2017 | Smith | .................. H04B 10/532 |

(Continued)

FOREIGN PATENT DOCUMENTS

| CN | 101399807 A | 4/2009 |
| CN | 103428158 A | 12/2013 |

(Continued)

*Primary Examiner* — Emmanuel Bayard
(74) *Attorney, Agent, or Firm* — Slater Matsil, LLP

(57) ABSTRACT

Binary forward error correcting (FEC) encoding is applied to a stream of input bits, to generate a stream of coded bits. The coded bits are mapped to multiple binary streams. In some embodiments, at least one coded bit is mapped to more than one of the binary streams and none of the binary streams are identical to each other. Stream-specific modulations are applied to the binary streams. Non-binary FEC encoding could be applied after the stream-specific modulations.

20 Claims, 10 Drawing Sheets

Related U.S. Application Data

(60) Provisional application No. 62/321,628, filed on Apr. 12, 2016.

(51) Int. Cl.
*H04L 27/34* (2006.01)
*H04B 1/69* (2011.01)

(56) References Cited

U.S. PATENT DOCUMENTS

| | | | |
|---|---|---|---|
| 2002/0085118 A1* | 7/2002 | Harris | G06Q 30/02 348/473 |
| 2002/0101915 A1* | 8/2002 | Zhang | H04L 1/0041 375/222 |
| 2008/0095262 A1* | 4/2008 | Ho | H04B 7/0697 375/295 |
| 2008/0118003 A1* | 5/2008 | Liu | H04L 1/0618 375/298 |
| 2009/0080556 A1 | 3/2009 | Duan et al. | |
| 2010/0125764 A1* | 5/2010 | Kose | H03M 13/1171 714/704 |
| 2011/0307766 A1* | 12/2011 | Picchi | H04L 1/0042 714/783 |
| 2012/0117442 A1* | 5/2012 | Lee | H04L 1/008 714/755 |
| 2013/0301599 A1* | 11/2013 | Valentin | H04L 1/0026 370/329 |
| 2014/0307832 A1* | 10/2014 | Sagong | H04L 27/18 375/298 |
| 2015/0358648 A1* | 12/2015 | Limberg | H04L 27/2627 725/109 |
| 2016/0087649 A1* | 3/2016 | Limberg | H04N 21/2383 714/776 |
| 2016/0330265 A1* | 11/2016 | Abdoli | H04L 5/0028 |
| 2018/0077685 A1* | 3/2018 | Wu | H04L 5/0046 |
| 2018/0083736 A1* | 3/2018 | Manolakos | H03M 13/2789 |
| 2018/0212628 A1* | 7/2018 | Chen | H03M 13/116 |

FOREIGN PATENT DOCUMENTS

| | | |
|---|---|---|
| CN | 103843275 A | 6/2014 |
| EP | 1313249 A2 | 5/2003 |
| EP | 2043317 A2 | 4/2009 |
| WO | 2008058109 A2 | 5/2008 |
| WO | 2013170161 A1 | 11/2013 |

* cited by examiner

METHODS AND APPARATUS FOR SIGNAL SPREADING AND MULTIPLEXING

CROSS-REFERENCE TO RELATED APPLICATIONS

This application is a continuation of PCT Patent Application No. PCT/CN2017/080098, filed on Apr. 11, 2017, which claims the benefit of U.S. Provisional Application No. 62/321,628, filed on Apr. 12, 2016, both of which applications are hereby incorporated by reference herein as if reproduced in their entirety.

TECHNICAL FIELD

This application relates to communications, and in particular to spreading a signal and multiplexing a plurality of signals that are to be transmitted.

In some embodiments, multiple levels of Forward Error Correction (FEC) codes are used, including binary (bit-level) and non-binary (symbol level) FEC codes.

BACKGROUND

Spreading of a signal over multiple time/frequency resources is performed for the purpose of achieving higher diversity, reliability and robustness to interference and channel variations.

Code division multiple access (CDMA) is a multiple access technique in which data symbols are spread out over orthogonal or near-orthogonal code sequences. Conventional CDMA encoding is a two-step process in which a binary code is mapped to a quadrature amplitude modulation (QAM) symbol before a spreading sequence is applied. CDMA can be considered a form of repetition of QAM symbols by using different amplitude and phases in accordance with the spreading sequence.

Conventional CDMA encoding can provide relatively high coding rates. However, new techniques/mechanisms for achieving even higher coding rates may be desirable to meet the ever-growing demands of next-generation wireless networks. Low density spreading (LDS) is a form of CDMA used for multiplexing different layers of data. LDS uses repetitions of the same symbol on layer-specific nonzero positions in time or frequency. As an example, in LDS-orthogonal frequency division multiplexing (OFDM) a constellation point is repeated over nonzero frequency tones of an LDS block. This sparse spreading helps reduce the decoding complexity when many (e.g., more than the spreading length) LDS signals are multiplexed together.

In sparse code multiple access (SCMA), a multidimensional codebook is used to spread data over tones without necessarily repeating symbols. In SCMA the multidimensional spreading codebooks are sparse and hence detection can be made simpler.

SUMMARY

According to an aspect of the present disclosure, a method involves: applying binary forward error correcting (FEC) encoding to a stream of input bits to generate a stream of coded bits; mapping the stream of coded bits to a plurality of binary streams such that at least one coded bit is mapped to more than one of the binary streams and none of binary streams are identical to each other; and applying stream-specific modulations to the plurality of binary streams.

According to another aspect, a method includes: applying binary forward error correcting (FEC) encoding to a stream of input bits to generate a stream of coded bits; mapping the stream of coded bits to a plurality of binary streams; applying stream-specific modulations to the plurality of binary streams to generate a plurality of first streams comprising complex-valued signals; and applying non-binary FEC encoding to the plurality of first complex-valued streams to generate a second complex-valued stream.

According to another aspect, an apparatus includes: a binary forward error correcting (FEC) encoder to encode a stream of input bits into a stream of coded bits; a bit mapper, coupled to the binary FEC encoder, to map the stream of coded bits to a plurality of binary streams such that at least one coded bit is mapped to more than one of the binary streams and none of binary streams are identical to each other; and a modulator, coupled to the bit mapper, to apply stream-specific modulations to the plurality of binary streams.

An apparatus according to another aspect includes: a binary forward error correcting (FEC) encoder to encode a stream of input bits into a stream of coded bits; a bit mapper, coupled to the binary FEC encoder, to map the stream of coded bits to a plurality of binary streams; a modulator, coupled to the bit mapper, to apply stream-specific modulations to the plurality of binary streams to generate a plurality of first streams comprising complex-valued signals; and a non-binary FEC encoder, coupled to the bit mapper, to encode the plurality of first complex-valued streams into a second complex-valued stream.

Also provided is a method that involves: receiving a signal comprising data streams to be decoded; generating coded bit log likelihood ratios (LLRs) using maximum likelihood (ML) detection; and decoding each data stream using FEC decoding.

In an embodiment, a message passing algorithm is used for calculating the coded bit LLRs, in which case a method includes receiving a signal comprising data streams to be decoded; generating coded bit LLRs using a message passing algorithm; and decoding each data stream using FEC decoding.

Another method involves: receiving a signal comprising data streams to be decoded; generating a stream of likelihood values using demodulation; calculating the stream of likelihood values by using iterative message passing, and decoding the data stream using FEC decoding.

A further method involves: receiving a signal comprising a data stream to be decoded; generating a stream of likelihood values using non-binary FEC decoding; calculating a stream of coded bit LLRs by using iterative message passing, and decoding the data stream using FEC decoding.

A non-transitory processor-readable medium may be used to store instructions which, when executed by one or more processors, cause the one or more processors to perform a method as disclosed herein.

An apparatus according to another aspect includes: a receiver to receive the signal referenced above; and one or more components, coupled to the receiver, configured to perform the generating, calculating, and/or decoding referenced above. In an embodiment, such an apparatus includes: a receiver to receive a signal comprising a data stream to be decoded; a signal detector, coupled to the receiver, to generate coded bit likelihood values using one of: ML detection, a message passing algorithm, a combination of demodulation and iterative message passing, and a combination of non-binary FEC decoding and iterative message passing; and a FEC decoder, coupled to the signal detector, to decode the data stream.

Aspects and features of the present disclosure will become apparent, to those ordinarily skilled in the art, upon review of the following description of the various embodiments of the disclosure.

BRIEF DESCRIPTION OF THE DRAWINGS

Embodiments will be described in greater detail with reference to the accompanying drawings.

DETAILED DESCRIPTION OF ILLUSTRATIVE EMBODIMENTS

Figure 1:
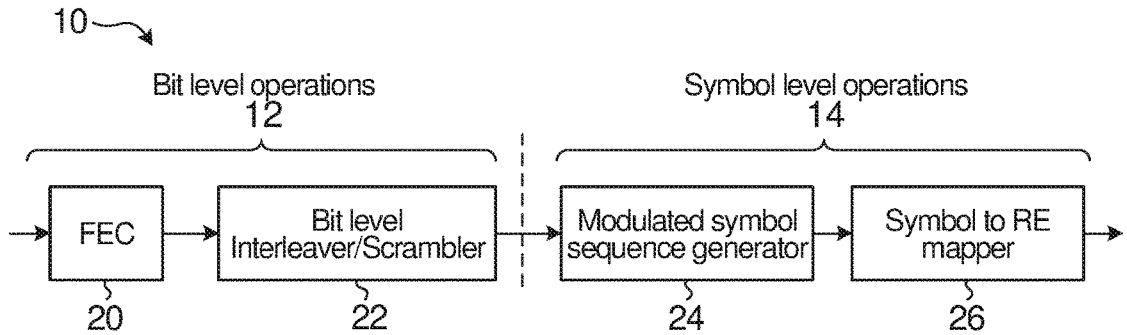
FIG. 1 is a block diagram illustrating an example of an apparatus that could be used in implementing a non-orthogonal multiple access (NoMA) scheme.

It should be understood at the outset that although illustrative implementations of one or more embodiments of the present disclosure are provided below, the disclosed systems and/or methods may be implemented using any number of techniques, whether currently known or later developed. The disclosure should in no way be limited to the illustrative implementations, drawings, and techniques illustrated below, including the designs and implementations illustrated and described herein, but may be modified within the scope of the appended claims along with their full scope of equivalents.

Demand for higher data rates in telecommunications systems continues to increase. At the same time, more transmission flexibility and robustness toward network impairments is demanded with minimal change to current network architecture. Improvement in efficient signaling design for signal spreading and multi-user signal multiplexing by reusing current physical layer structure is an area that could aid in meeting these demands.

Aspects of the present disclosure may involve using current physical layer communication system structure to provide efficient signaling design for spreading. Signal spreading may provide more reliability, diversity and robustness towards network impairments. Multi-user signal multiplexing may provide more spectral efficiency, scheduling flexibility, robustness to channel state information (CSI) feedback accuracy, robustness to channel aging, and robustness to issues that may arise from UE mobility, for example.

The present disclosure provides many different methods that can be used or performed by a transmitter. A first method includes generating different streams of binary sequences at the output of a bit mapping component that is coupled to an output of a FEC encoder, e.g. a turbo encoder, and mapping each stream of the binary sequences to a QAM symbol or another complex-valued modulation symbol using a stream-specific modulator, and mapping these streams of complex-valued modulation symbols to another stream of complex-valued symbols using a non-binary FEC encoding, such as Reed-Solomon encoding.

In an embodiment, the method includes generating different streams of binary sequences at the output of a bit mapping component that is coupled to an output of a FEC encoder, e.g. a turbo encoder, and mapping each stream of the binary sequences to a QAM symbol or another complex-valued modulation symbol.

Another embodiment of a method at a transmitter includes two-level FEC encoding. Such a method may involve using binary FEC encoding to generate a coded bit stream which is then divided into a plurality of coded bit streams, mapping each coded bit stream to a QAM symbol or another complex-valued modulation symbol using a stream-specific modulator to generate a plurality of QAM symbols or other complex-valued modulation symbols, and mapping these complex-valued modulation symbols to complex-valued symbols using a non-binary FEC encoding, such as Reed-Solomon encoding.

A method at a transmitter could also or instead involve applying sparse spreading on the generated complex-valued symbols by mapping the complex-valued symbols to non-zero entries of a signature pattern. In an embodiment, the method also involves sparse spreading by directly applying non-binary FEC encoding with possible zero output symbols.

A second method at a transmitter involves multiplexing complex-valued signals that are to be transmitted to multiple UEs. In an embodiment, the method involves generating complex-valued modulation symbols for each UE signal using a UE-specific (and/or user-specific) mapping rule and/or UE-specific (and/or user-specific) sparse spreading, and multiplexing the symbols in the UEs' signals together using a UE-specific (and/or user-specific) power scaling vector.

In another embodiment, a method at a transmitter involves generating a signal that includes data to be transmitted to a plurality of UEs. Binary sequences are generated by a stream-specific bit mapper that is coupled to an output of an FEC encoder, e.g. a turbo encoder, and each multiplexed binary sequence is mapped to a QAM symbol or another complex-valued modulation symbol using a stream-specific modulator.

Another method at a transmitter includes generating the signal that includes the data to be transmitted to a plurality of UEs by first using a binary FEC to generate a plurality of coded bit streams for each UE, and then multiplexing the coded bit streams of different UEs to generate a binary stream which is then mapped to a plurality of binary streams using a bit mapping component. In an embodiment, the method further includes mapping each binary stream to a QAM symbol or another complex-valued modulation symbol using a stream-specific modulator, generating a plurality of QAM symbols or other complex-valued modulation symbols, and mapping the complex-valued modulation symbols to a plurality of complex-valued symbols using non-binary FEC encoding.

The present disclosure also provides many different methods that can be used or performed by a receiver. A first method at a receiver includes attempting to decode the data of at least one of a plurality of UEs. The method further includes joint maximum likelihood (ML) detection of the data of at least one of the plurality of UEs, calculating the log-likelihood ratios (LLRs) for the coded bits of at least one of the plurality of UEs, and decoding the data of at least one of the plurality of UEs using FEC decoding, e.g. in a Turbo decoder.

In another embodiment, a method at a receiver involves using a message passing algorithm (MPA) to calculate the LLRs for the coded bits of at least one of a plurality of UEs, and decoding the data of at least one of the plurality of UEs using FEC decoding, e.g. in a Turbo decoder.

Another method at a receiver includes QAM de-mapping to generate the likelihood values of each symbol that includes data for at least one of plurality of UEs, iterative message passing to find a second set of LLRs for coded bits of at least one of plurality of UEs, and decoding the data of at least one of plurality of UEs using FEC decoding, e.g. in a Turbo decoder.

Another method at a receiver includes non-binary FEC decoding to generate the likelihood values of each symbol that includes the data of at least one of plurality of UEs, iterative message passing to find the second set of LLRs for coded bits of at least one of plurality of UEs, and decoding the data of at least one of plurality of UEs using FEC decoding, e.g. in a Turbo decoder.

Example embodiments will now be described with reference to the drawings. The embodiments set forth herein represent information sufficient to practice the claimed subject matter and illustrate the best way of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Embodiments disclosed herein could be applied in multiple access scenarios, including but not in any way limited to non-orthogonal multiple access NoMA, for example. FIG. 1 is a block diagram illustrating an example of an apparatus that could be used in implementing a NoMA scheme.

NoMA generally allows multiple signals to be transmitted from one or more transmitters to one or more receivers simultaneously on a given shared resource. The shared resource may include a time resource, a frequency resource, a space resource or some combination thereof. In a downlink (DL) scenario, a network side device can transmit to multiple separate user equipment (UE). In an uplink (UL) scenario multiple UEs can transmit to a network side receiver.

In the UL NoMA scenario, the UEs process information bits arranged in one or more layers to become symbols for transmission on multiple tones. In NoMA, there are likely to be collisions of symbols from the multiple UEs at the receiver that receives the signals. A NoMA technique may attempt to distinguish the transmitted signals from the multiple UEs by applying some UE specific (and/or user-specific) or layer-specific features that are unique to the UE or layer, respectively.

Distinct multiple access schemes can be developed based on such UE-specific (and/or user-specific) or layer specific (or both) features or signal processing operations. These signal processing operations may include, but are not limited to: FEC, bit-level interleaving/scrambling; modulated symbol sequence generator; and symbol to RE mapping.

A framework is proposed for generating a NoMA signal based on selection of a particular set of signal processing operations. The set of signal processing operations are then used to process information bits and generate the NoMA signal for transmission. Various NoMA schemes that each includes a different subset of the signal processing operations can be derived using the framework. Such a framework can be used by a UE to select a NoMA scheme having a set of signal processing operations that meets a desired transmission application.

FIG. 1 illustrates an example of a system 10 implementing a collection of signal processing operations that may be part of a framework for generating a NoMA signal, which includes units to function as a FEC encoder 20, a bit-level interleaver/scrambler 22, a modulated symbol sequence generator 24, and a symbol to RE mapper 26. Bit-level operations and symbol-level operations are also labelled at 12, 14, respectively, in FIG. 1.

A stream of information bits is provided to the FEC encoder 20 to perform forward error correction (FEC) encoding 700. The information bits are processed with a FEC channel code, which could be a low density parity check (LDPC) code, a Turbo code, a polar code, or another type of code. In one embodiment, a block of K information bits is encoded and N>K coded bits are generated.

The encoded bits are then provided to bit-level interleaver/scrambler 22 for bit-level interleaving/scrambling. In the bit-level interleaver/scrambler 22, the coded bits are interleaved and/or scrambled, and interleaved/scrambled bits are generated. The bit-level interleaver/scrambler 22 could be user- (or receiver) specific, such that each user or receiver is associated with a specific interleaver/scrambler sequence or scheme, or is associated with a cell-specific interleaver/scrambler sequence, such that a specific interleaver/scrambler sequence or scheme is applied for receivers in each cell or service area in a network.

An output of coded bits from the bit-level interleaver/scrambler 22 is provided to the modulated symbol level sequence generator 24. The modulated symbol level sequence generator 24 generates symbols from the coded bits. In the modulated symbol sequence generator 24, the interleaved/scrambled bits are mapped to modulated symbols, with or without additional symbol-level spreading operations. The bit-to-symbol mapping could be one or multiple bits to one or multiple symbols. Symbol-level spreading could involve multiplying the symbols with spreading codes, which may include one or multiple stages, and the length of spreading code could be different at each stage.

Although not specifically shown in FIG. 1, an output of the modulated symbol level sequence generator 24 could be provided to a symbol sequence precoder that performs symbol precoding. Such precoding could be intended to reduce the peak to average power ratio (PAPR) of a transmitted signal, which may improve coverage of the transmitted signal. In the case of an OFDM waveform, discrete Fourier transform (DFT) precoding might be used.

A symbol sequence, which may have been precoded in some embodiments, is provided to the symbol to resource element (RE) mapper 26. The modulation symbols are mapped to resource elements for transmission, with or without additional symbol-level interleaving/scrambling. A symbol-level interleaver/scrambler could be user-specific, such that each user has a specific symbol-level interleaver/scrambler sequence or scheme, or cell-specific, with a specific symbol-level interleaver/scrambler sequence or scheme being applied for the receiver in each cell or coverage area of a network.

Other operations or features could also be implemented. For example, a waveform modulator could be implemented to generate, after the symbols have been mapped the REs, the actual signal to be transmitted over the air.

According to the framework illustrated in FIG. 1, information bits are first encoded using a FEC encoder, and bit-level interleaving/scrambling is applied to coded bits. These are bit-level operations. UE-specific, or more generally user-specific, symbol-level operations including modulated symbol sequence generation and symbol-to RE mapping are applied. Such a framework may assist a receiver in decoding signals of multiplexed receivers more efficiently.

FIG. 1 is intended solely as an illustrative example of a multiple access scenario in which disclosed embodiments could be applied. Embodiments disclosed herein could be used, for example, to implement modulated symbol sequence generation at 24 in FIG. 1. As will be apparent from the other drawings and the following description, however, embodiments could be related to other parts of the NoMA framework illustrated in FIG. 1.

Figure 2A:
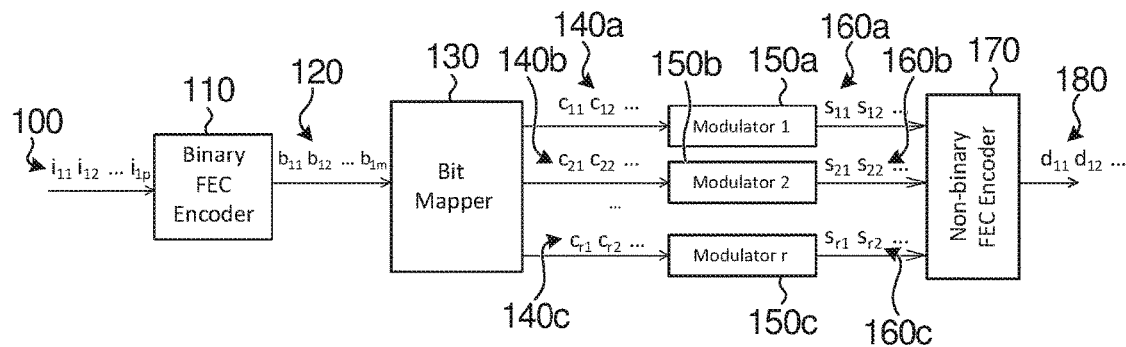
FIG. 2A is a block diagram of an apparatus implementing a signal spreading technique according to an aspect of the disclosure.

Referring to FIG. 2A, an example of a general framework for signal spreading will be described. FIG. 2A is a block diagram of an apparatus implementing a signal spreading technique according to an aspect of the disclosure. The example apparatus includes a binary FEC encoder no, a bit mapper 130 coupled to the binary FEC encoder, modulators 150a, 150b, 150c coupled to the bit mapper, and a non-binary FEC encoder 170 coupled to the modulators. The components in FIG. 2A could be implemented in circuitry that is configured to perform operations as disclosed herein. These components could be implemented using hardware, firmware, and/or other components which execute software that is stored on one or more non-transitory computer or processor readable media (e.g. in the form of modules), examples of which are provided above, or some combination thereof. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and/or other types of "intelligent" integrated circuits.

A bit stream or sequence 100 is shown to represent input binary bits that are to be transmitted to an intended receiver, such as user equipment (UE). The input bits of the bit sequence 100 are fed into the binary FEC encoder no to generate the stream or sequence of coded bits 120. Then, the sequence of coded bits 120 is mapped to a plurality of binary sequences 140a, 140b and 140c using a bit mapper 130. The binary sequences 140a-c include subsets of the coded bits 120. These subsets are determined by bit mapper 130. Bit mapper 130 also determines the order of the coded bits in each binary sequence 140a-c. The bit mapper 130 could interleave, scramble, or otherwise change the order of the coded bits 120 before they are mapped to the binary sequences 140a-c. In another embodiment, a separate bit level interleaver/scrambler as shown at 22 in FIG. 1, could be provided and coupled between the binary FEC encoder no and the bit mapper 130. In other embodiments, the bit mapper 130 performs any bit-level interleaving, and a separate bit-level scrambler is coupled between the FEC encoder no and the bit mapper.

The binary sequences 140a-c are mapped to complex-value symbols 160a, 160b and 160c using stream-specific modulators 150a, 150b and 150c. The modulators 150a-c could be QPSK modulators, for example. In another embodiment, the modulators 150a-c are QAM modulators with Gray labeling or different labeling. Different modulators 150a-c could potentially be used for different streams.

The set of complex-value symbols 160a, 160b and 160c are fed into the non-binary FEC encoder 170 to generate the output symbols 180 to be transmitted. The non-binary FEC encoder 170 could apply a spreading matrix in which the output of each modulator 150a-c is multiplied by a spreading sequence. Symbol-level scrambling and/or interleaving could also or instead be implemented by the non-binary FEC encoder 170, by applying a scrambling sequence and/or interleaving matrix to the symbols 160a-c.

With reference to the NoMA architecture in FIG. 1, the generated output symbols 180 could be provided as inputs for symbol to RE mapping at 26

Figure 2B:
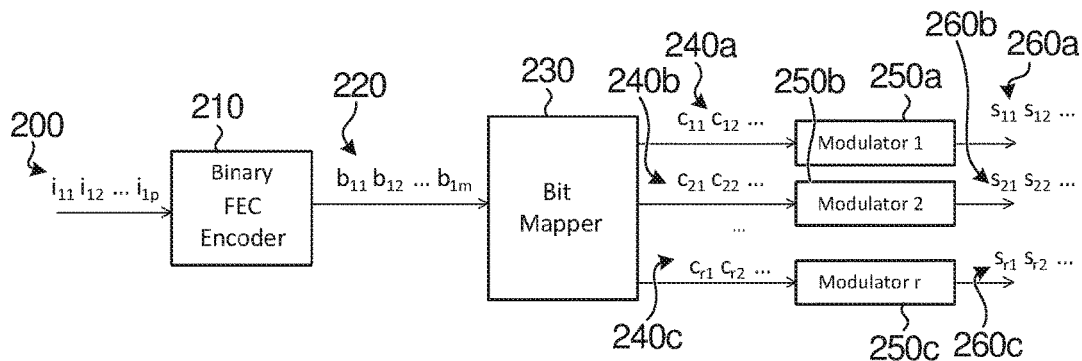
FIG. 2B is a block diagram of an apparatus implementing a signal spreading technique according to another aspect of the disclosure.

Referring to FIG. 2B, an example of an embodiment of a general framework for signal spreading and multi-user multiplexing shown in FIG. 2A will be described. FIG. 2B is a block diagram of an apparatus implementing a signal spreading technique according to another aspect of the disclosure. The apparatus in FIG. 2B, like the apparatus in FIG. 2A, includes a binary FEC encoder 210, a bit mapper 230 coupled to the binary FEC encoder, and modulators 250a, 250b, 250c coupled to the bit mapper. The example implementations of components in FIG. 2A provided above also apply to the corresponding components in FIG. 2B. Operations of components as described above with reference to FIG. 2A also apply to the corresponding components in FIG. 2B.

The sequence 200 is shown to represent input binary bits that are to be transmitted to a receiver, such as a UE, for uplink communications. Embodiments could also or instead be implemented for uplink communications from UEs to a base station or a network node. Therefore, a UE is referenced herein as an illustrative example of a receiver. A base station, network node, or other network equipment could also or instead be an intended receiver of transmitted signals.

Input bits 200 are fed into the binary FEC encoder 210 to generate the sequence of coded bits 220. Then, the sequence of coded bits 220 is fed into the bit mapper 230, which outputs a plurality of output streams 240a, 240b, and 240c. Each output binary stream 240a-c is mapped to a stream-specific modulator 250a-c, examples of which are described above with reference to FIG. 2A, generating complex-valued symbols of 260a, 260b, 260c per stream. The complex-valued symbols could be encoded by a non-binary FEC encoder as shown at 170 in FIG. 2A, and/or mapped to REs as shown at 26 in FIG. 1.

In one embodiment, the coded bit stream 220 includes coded bits b0b1b2, bit mapper 230 generates two streams 240a-b of size 2, including a first stream with bits b0b5 and a second stream including bits b1b2, and the modulators 250a-b are QPSK modulators. In this example, b1 is present in both streams.

Figure 3:
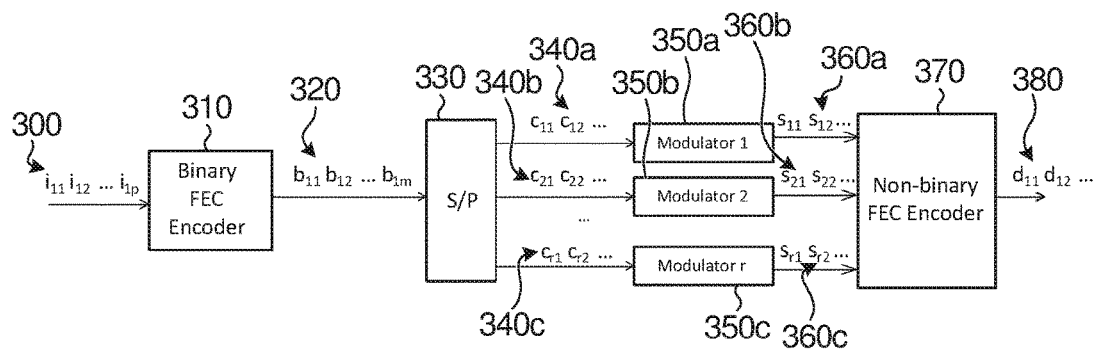
FIG. 3 is a block diagram of an apparatus implementing a signal spreading technique according to another aspect of the disclosure.

Referring to FIG. 3, an example of an embodiment of a general framework for signal spreading and multi-user multiplexing shown in FIG. 2A will be described. FIG. 3 is a block diagram of an apparatus implementing a signal spreading technique according to another aspect of the disclosure. The apparatus in FIG. 3, like the apparatus in FIG. 2A, includes a binary FEC encoder 310, a bit mapper 330 coupled to the binary FEC encoder, and modulators 350a, 350b, 350c coupled to the bit mapper. The example implementations of components in FIG. 2A provided above also apply to the corresponding components in FIG. 3. Operations of components as described above with reference to FIG. 2A also apply to the corresponding components in FIG. 3.

The sequence 300 is shown to represent input binary bits to be transmitted to a receiver, such as a UE. Input bits 300 are fed into the FEC encoder 310 to generate the sequence of coded bits 320. Then, the sequence of coded bits 320 is divided into a plurality of binary sequences 340a, 340b and 340c using a serial to parallel (S/P) converter 330. Bit-level interleaving and/or scrambling, as shown at 22 in FIG. 1, could be implemented in an interleaver/scrambler that is coupled between the FEC encoder 310 and the S/P converter 330, or as a feature of the S/P converter 330 itself. The binary sequences 340a-c are mapped to complex-value symbols 360a, 360b and 360c using stream-specific modulators 350a, 350b and 350c, examples of which are described above with reference to FIG. 2A. Then, the sets of complex-value symbols 360a, 360b and 360c are fed into the symbol-level FEC encoder 370, examples of which are also described above, to generate the output symbols 380 to be transmitted. The symbols 380 could be mapped to REs as shown at 26 in FIG. 1.

FIGS. 2B and 3 represent example implementations of the overall framework of FIG. 2A. Signal spreading could be provided by bit mapping at 230 such that the bit streams 240a-c have some common bits and some different bits, by the non-binary FEC encoder 370, or both.

Figure 4:
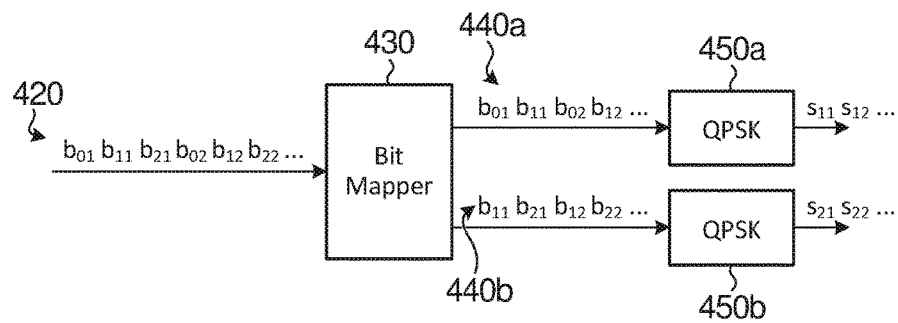
FIG. 4 is a block diagram of an apparatus implementing a bit mapping and modulation technique according to another aspect of the disclosure.
Figure 5:
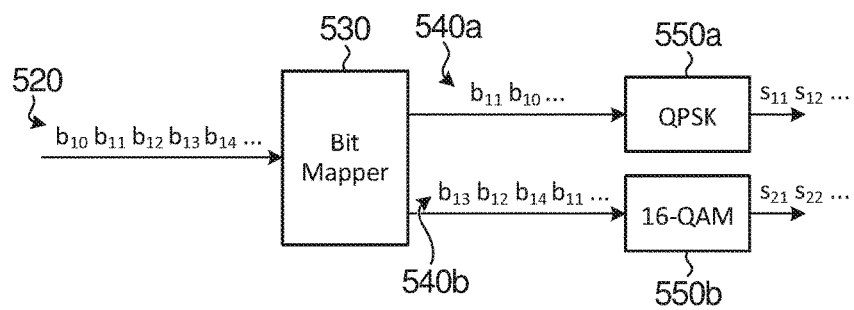
FIG. 5 is a block diagram of an apparatus implementing a bit mapping and modulation technique according to another aspect of the disclosure.

FIGS. 4 and 5 are block diagrams of an apparatus implementing bit mapping and modulation techniques according to embodiments. The example implementations and operation of components in FIG. 2A provided above also apply to the corresponding components in FIGS. 4 and 5. Although FIGS. 4 and 5 illustrate only a bit mapper and modulators coupled to the bit mapper, other components such as a binary FEC encoder, a bit-level interleaver/scrambler, a non-binary FEC encoder, and/or a symbol to RE mapper, for example, could be provided in other embodiments.

In FIG. 4, the bit mapper 430 maps input bits 420 to bit streams 440a-b such that bits b11 and b12 are common to both bit streams, and bits b01, b02, b21, and b22 are disjoint between the bit streams. The QPSK modulators 450a-b are stream-specific modulators in FIG. 4. The bit mapper 430 provides signal spreading, and therefore there may or may not be a non-binary FEC encoder coupled to the QPSK modulators 450a-b.

In FIG. 5, the bit mapper 530 maps input bits 520 to bit streams 540a and 540b such that bit b11 is common to both bit streams. The QPSK modulator 550a and 16-QAM modulator 550b are the stream-specific modulators in this example. As shown, the bit streams 540a-b include segments b11b20 and b13b12b14b11 of different lengths, in ratios proportional to the modulation orders of the modulators 550a, 550b. Furthermore, the order of the bits can be changed by the bit mapper 530, or by a separate interleaver/scrambler coupled to the bit mapper, for both streams. Again, the bit mapper 530 provides signal spreading, and therefore there may or may not be a non-binary FEC encoder coupled to the modulators 550a-b.

Figure 6:
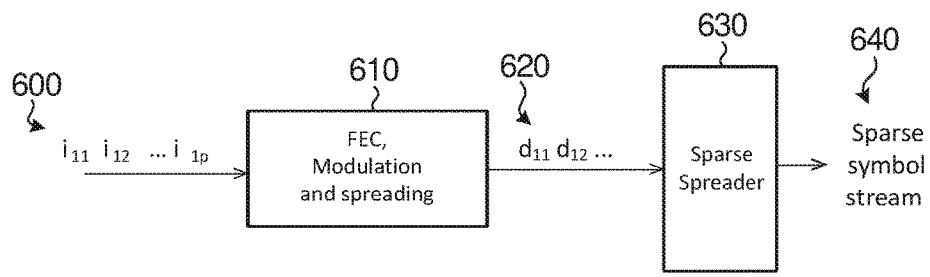
FIG. 6 is a block diagram of an apparatus implementing a sparse signal spreading technique according to another aspect of the disclosure.

Referring to FIG. 6, which is a block diagram of an apparatus implementing a sparse signal spreading technique according to another aspect of the disclosure, an example of sparse spreading will be described. The apparatus shown in FIG. 6 includes a FEC modulation and spreading module 610 and a sparse spreader 630. The example implementations in FIG. 2A provided above also apply to the components in FIG. 6. Other components such as a bit-level interleaver/scrambler, a non-binary FEC encoder, and/or a symbol to RE mapper, for example, could be provided in other embodiments.

FIG. 6 relates to an embodiment in which the generated output symbols 620, generated from input bits 600, are fed into the sparse spreader 630. Binary FEC encoding, modulation, and spreading (by bit mapping and/or non-binary FEC encoding) are performed by module 610. The sparse spreader 630 maps the output symbols 620 to corresponding non-zero entries of a sparse spreading vector and generates the sparse output symbols 640. Sparse symbol to RE mapping could also or instead be implemented in FIG. 6. For example, a sparse symbol to RE mapper, instead of the sparse spreader 630, could be coupled to the module 610 to implement sparse symbol to RE mapping.

Figure 7:
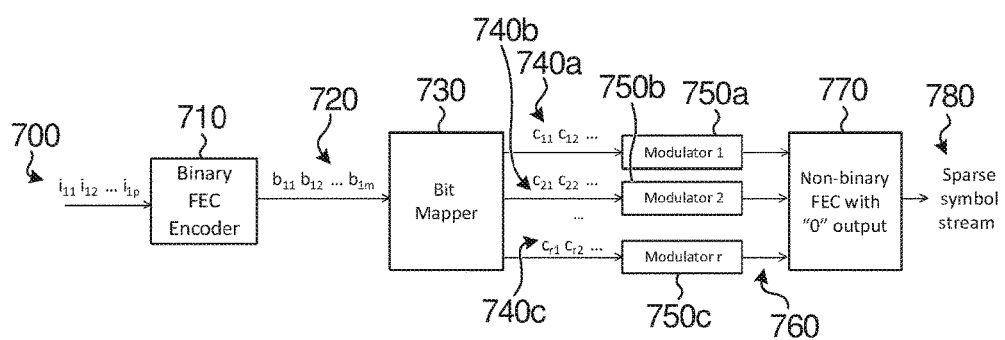
FIG. 7 is a block diagram of a sparse signal spreading apparatus according to another aspect of the disclosure.

In another embodiment of a sparse signal spreading technique illustrated by way of an example apparatus in FIG. 7, the sequences of complex-valued symbols at 760 are fed into non-binary FEC encoder 770 with possible "o" output to generate the sparse output symbols 780. For completeness in FIG. 7, the input bits 700, binary FEC encoder 710, coded bit stream 720, bit mapper 730, bit streams 740a-c, and modulators 750a-c are also shown. The example implementations and operation of components in FIG. 2A provided above also apply to the corresponding components in FIG. 7.

Figure 8:
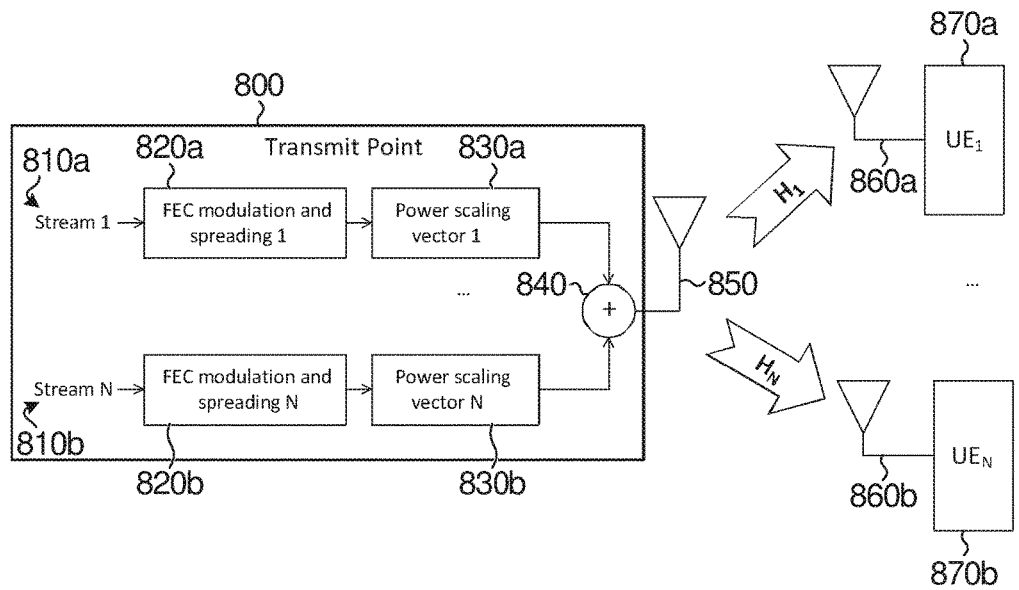
FIG. 8 is a block diagram of a signal spreading and multi-user signal multiplexing apparatus according to another aspect of the disclosure.

Referring now to FIG. 8, which is a block diagram of a signal spreading and multi-user signal multiplexing apparatus according to another aspect of the disclosure, an example of signal spreading and multiplexing of receivers, such as multiple UEs, will be discussed. The example implementations of components in FIG. 2A provided above also apply to the components of at least the transmit point 800 in FIG. 8. Such implementations could also be applied to the UEs 870, 870b. The antennas 850, 860a, 860b could include one or more physical antenna elements of any of various types, together with appropriate transmit circuitry or modules at the transmit point 800 and at least appropriate receive circuitry or modules at the UEs 870a-b.

In the example transmit point 800, the input bit streams 810a and 810b are first fed into the blocks 820a and 820b representing binary FEC, modulation, and spreading, by stream-specific bit mapping and/or non-binary FEC encoding, for example. Bit-level interleaving/scrambling, symbol-level interleaving/scrambling, and/or symbol to RE mapping could also be provided. Each stream of output symbols is fed into UE-specific (and/or user-specific) power scalers 830a-b, which apply power scaling vectors to scale the input symbols using a real-valued vector to generate the output power-scaled symbols. These power-scaled vectors are added together by adder 840 and generate a multiplexed symbol stream for transmission to UEs 870a-b through antennas 850 and 860a-b. In the illustrated embodiment, the UEs 870a-b are examples of receivers.

Figure 9:
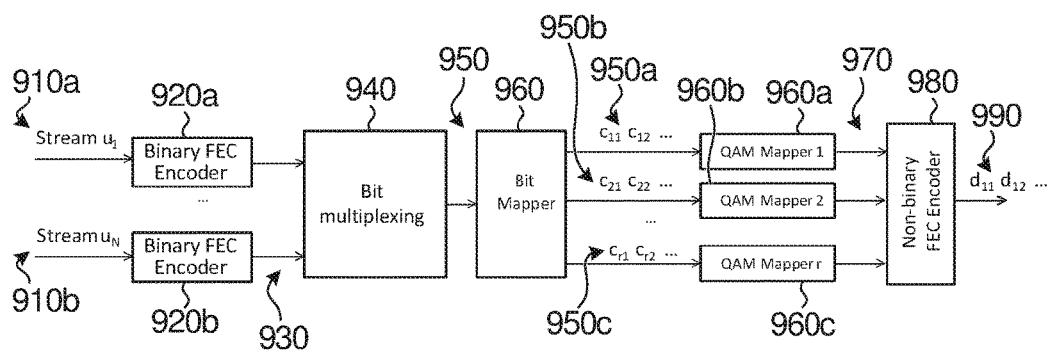
FIG. 9 is a block diagram of a signal spreading and multi-user signal multiplexing apparatus according to another aspect of the disclosure.

Referring to FIG. 9, which is a block diagram of a signal spreading and multi-user signal multiplexing apparatus according to another aspect of the disclosure, another example of signal spreading and multiplexing of receivers, such as multiple UEs, will be discussed. The example implementations and operation of components in FIG. 2A provided above also apply to the components shown in FIG. 9.

The input bit streams 910a and 910b are first fed into the binary FEC encoders 920a and 920b. The streams of output coded bits at 930 are fed into bit multiplexer 940, which performs bit multiplexing to generate a single stream of bits 950. The bit multiplexer 940 may apply additional transformations or logical operations, such as bit-level interleaving/scrambling for example, but in an embodiment applies only bit multiplexing. Bit-level interleaving/scrambling could also or instead be applied to the stream 950 by the bit mapper 960 or by a separate interleaver/scrambler, and/or to any or all of the coded bit streams 930 by one or more interleavers/scramblers.

The stream 950 is divided into a plurality of binary sequences 950a, 950b and 950c by the bit mapper 960. Then, these binary sequences are mapped to complex-value symbols at 970, by stream-specific modulators 960a, 960b and 960c. Then, the sets of complex-value symbols at 970 are fed into the non-binary FEC encoder 990 to generate the output symbols 990 to be transmitted, and those symbols could be mapped to REs, as shown at 26 in FIG. 1.

Figure 10:
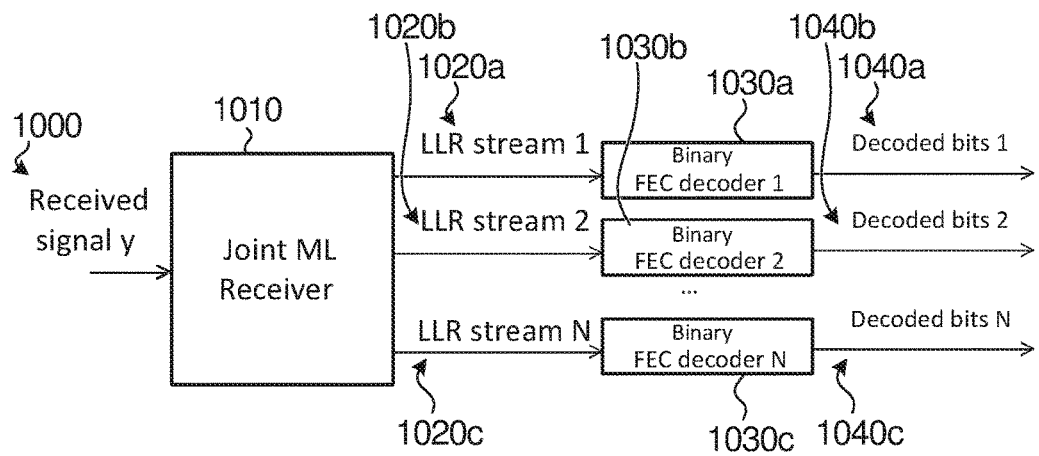
FIG. 10 is a block diagram of a receiver apparatus according to another aspect of the disclosure.

Referring to FIG. 10, which is a block diagram of a receiver apparatus according to another aspect of the disclosure, an example of a receiver to decode the data streams corresponding to a plurality of receivers such as UEs will be described. The example apparatus includes a joint maximum likelihood (ML) detector or receiver 1010, and binary FEC decoders 1030a, 1030b, 1030c coupled to the joint ML detector. The components in FIG. 10 could be implemented in circuitry that is configured to perform operations as disclosed herein, and examples are described above.

The received signal 1000 is fed into the joint ML detector 1010 to generate the output LLRs of coded bit streams 1020a, 1020b and 1020c corresponding to each data stream. Coded bit streams 1020a, 1020b and 1020c are then fed into the binary FEC decoders 1030a, 1030b and 1030c to generate the final decoded bit streams 1040a, 1040b and 1040c.

Figure 11:
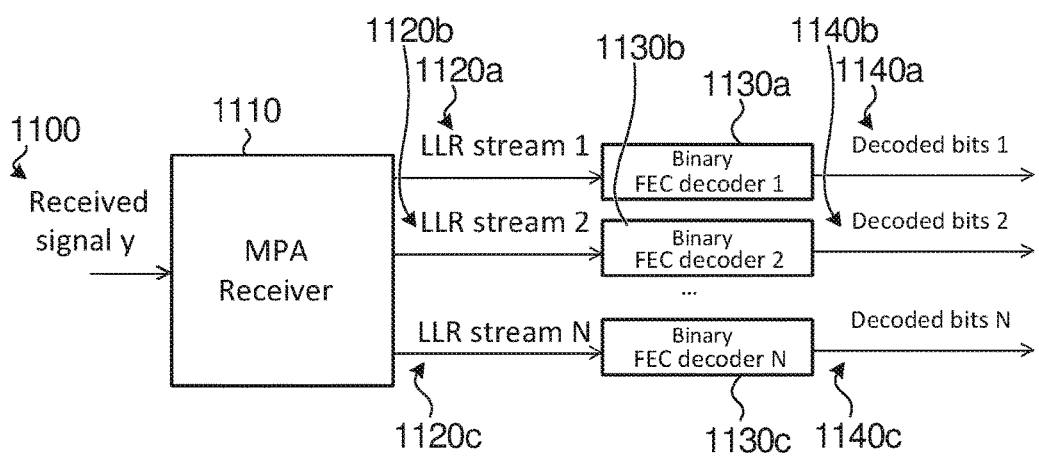
FIG. 11 is a block diagram of a receiver apparatus according to another aspect of the disclosure.

Referring to FIG. 11, which is a block diagram of a receiver apparatus according to another aspect of the disclosure, an example of an embodiment of the receiver in FIG. 10 to decode the data streams corresponding to a plurality of receivers such as UEs with sparse spreading will be described. The detector or receiver 1110 and the binary FEC decoders 1130a, 1130b, 1130c coupled thereto could be implemented as described above for the receiver/detector and decoders in FIG. 10.

The received signal 1100 is fed into the message passing algorithm (MPA) detector 1110 to generate the output LLRs of coded bit streams 1120a, 1120b and 1120c corresponding to each data stream. Coded bit streams 1120a, 1120b and 1120c are then fed into the binary FEC decoders 1130a, 1130b and 1130c to generate the final decoded bit streams 1140a, 1140b and 1140c.

Figure 12:
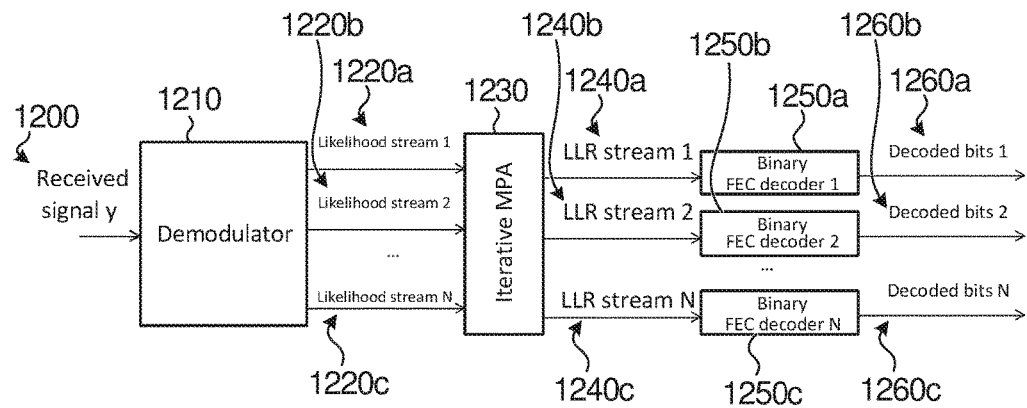
FIG. 12 is a block diagram of a receiver apparatus according to another aspect of the disclosure.

Referring to FIG. 12, which is a block diagram of a receiver apparatus according to another aspect of the disclosure, an example of a receiver to decode the data streams corresponding to a plurality of receivers such as UEs will be described. The example apparatus includes a demodulator 1210, an iterative MPA detector 1230 coupled to the demodulator, and binary FEC decoders 1250a, 1250b, 1250c coupled to the detector. The components in FIG. 12 could be implemented in circuitry that is configured to perform operations as disclosed herein, and examples are described above.

The received signal 1200 is fed into the demodulator 1210 to generate the output likelihood streams 1220a, 1220b and 1220c corresponding to each data stream. An example of the demodulator 1210 includes a QAM demapper. The streams of likelihood values are fed into the iterative message passing detector 1230 to take advantage of the redundant bits in the streams of symbols and potentially enhance the reliability of the LLRs of coded bit streams 1240a, 1240b and 1240c. The LLR streams 1240a, 1240b and 1240c are then fed into the binary FEC decoders 1250a, 1250b and 1250c to generate the final decoded bit streams 1260a, 1260b and 1260c.

Figure 13:
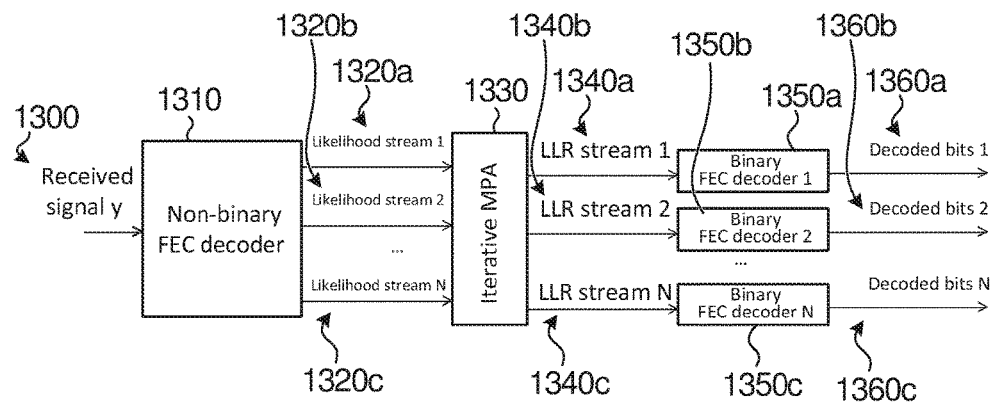
FIG. 13 is a block diagram of a receiver apparatus according to another aspect of the disclosure.

Referring to FIG. 13, which is a block diagram of a receiver apparatus according to another aspect of the disclosure an example of a receiver to decode the data streams corresponding to a plurality of receivers such as UEs will be described. The iterative MPA detector 1330 and the binary FEC decoders 1350a, 1350b, 1350c coupled thereto could be implemented as described above for the detector and decoders in FIG. 12. The example component implementation options provided above for other components could also be applied to the non-binary FEC decoder 1310.

The received signal 1300 is fed into the non-binary FEC decoder 1310 to generate the output likelihood streams 1320a, 1320b and 1320c corresponding to each data stream. An example of a non-binary FEC decoder is a Reed-Solomon decoder. The streams of likelihood values are fed into the iterative message passing detector 1330 to take advantage of the redundant bits in the streams of symbols and potentially enhance the reliability of the LLRs of coded bit streams 1340*a*, 1340*b* and 1340*c*. The LLR streams 1340*a*, 1340*b* and 1340*c* are then fed into the FEC decoders 1350*a*, 1350*b* and 1350*c* to generate the final decoded bit streams 1360*a*, 1360*b* and 1360*c*.

Figure 14:
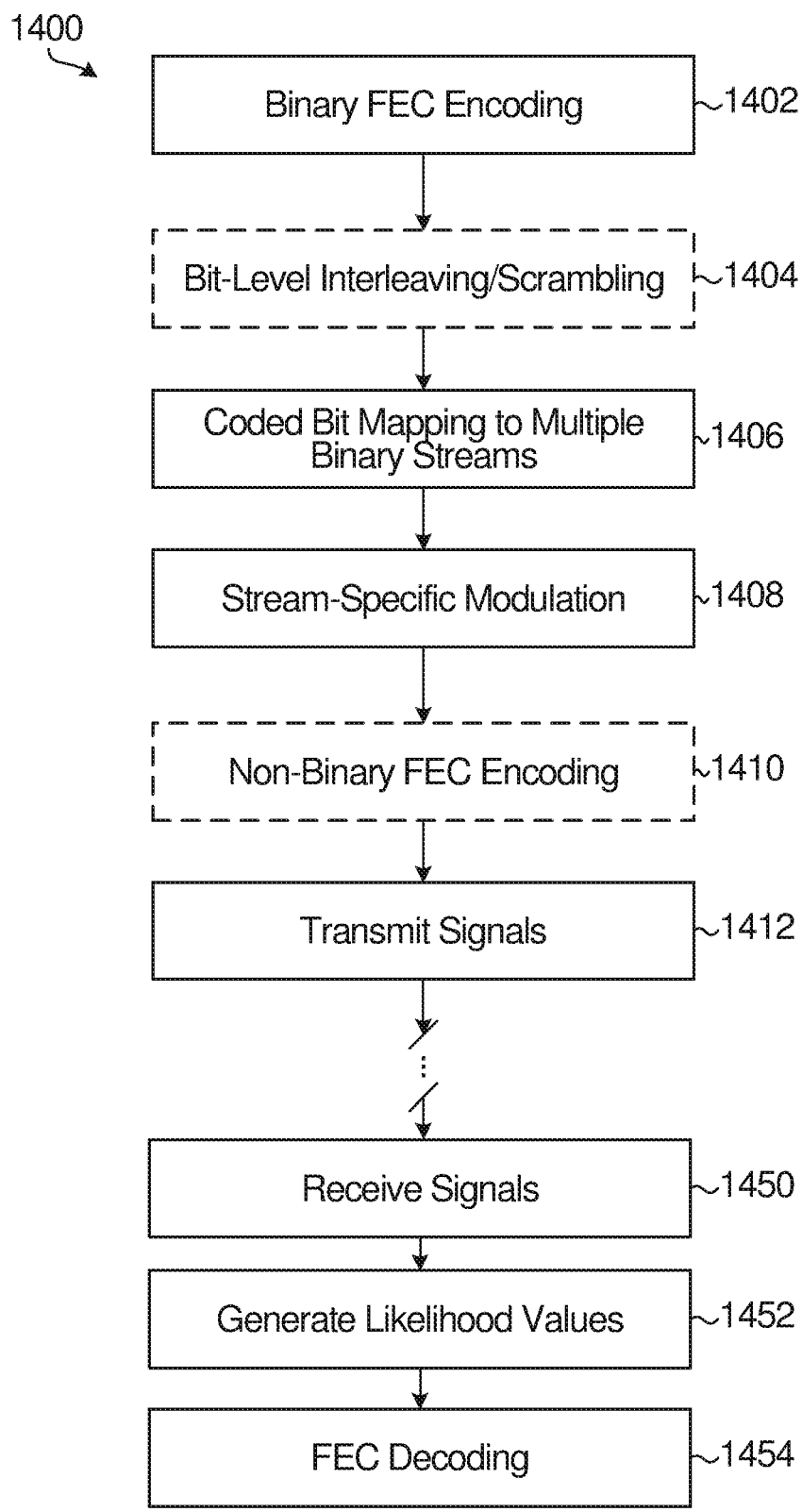
FIG. 14 is a flow diagram of an example method according to an embodiment.

Various embodiments are described by way of example above. FIG. 14 is a flow diagram of an example method, and more generally illustrates aspects of the present disclosure.

The example method 1400 includes applying binary FEC encoding to a stream of input bits at 1402, to generate a stream of coded bits. As also described elsewhere herein, the mapping could include interleaving and/or scrambling of the stream of coded bits. In other embodiments, either or both of interleaving and scrambling could be provided separately from the mapping, as shown at 1404. The example method 1400 also includes mapping the stream of coded bits to a plurality of binary streams at 1406. In some embodiments, at least one coded bit is mapped to more than one of the binary streams and none of the binary streams are identical to each other. Stream-specific modulations are applied to the plurality of binary streams at 1408.

Applying stream-specific modulations at 1408 could involve generating a plurality of first streams comprising complex-valued signals. A method could involve applying non-binary FEC encoding to the plurality of first complex-valued streams, at 1410, to generate a second complex-valued stream.

An operation of transmitting signals is shown at 1412 as an illustrative example of further operations that could be performed after coding and modulation. Other variations of the example method 1400 could include performing the illustrated operations in any of various ways, in a similar or different order than shown, and/or performing additional or fewer operations.

For example, the binary streams into which coded bits are mapped at 1406 could, but might not necessarily be, disjoint. The mapping at 1406 could involve dividing the stream of coded bits among the binary streams.

Applying binary FEC encoding at 1402 could involve applying binary FEC encoding to streams of input bits that are associated with multiple UEs, to generate streams of coded bits. A method could then involve bit multiplexing the streams of coded bits into a bit multiplexed stream of coded bits, and mapping the bit multiplexed stream of coded bits into multiple streams at 1406. In another embodiment, the streams of coded bits are mapped at 1406, and symbols that are generated from the binary streams by the stream-specific modulations at 1408 (or a second complex-valued stream generated by optional non-binary FEC encoding at 1410) are multiplexed using stream-specific power scaling vectors.

The stream-specific modulations that are applied at 1408 could include, for example QAM mapping, with Gray or non-Gray labeling. The stream-specific modulations could also or instead include stream-specific modulations of different orders.

The optional non-binary FEC encoding at 1410 could involve outputting the first complex-valued streams as the second complex-valued stream. In another embodiment, the non-binary FEC encoding at 1410 involves symbol-level spreading in which each of the first complex-valued streams is multiplied by a spreading sequence. Other embodiments encompass non-binary FEC encoding that includes one or both of: symbol-level scrambling in which each of the first complex-valued streams is multiplied by a scrambling sequence, and symbol-level interleaving in which each of the first complex-valued streams is multiplied by an interleaving s.

Methods could also involve sparsely spreading the stream-specific modulated binary streams, or a second complex-valued stream from non-binary FEC encoding, using a sparse spreading vector. Such spreading involves spreading symbols that are generated from the binary streams by the stream-specific modulations, or FEC-encoded symbols if non-binary FEC encoding is applied.

In some embodiments, sparsely spreading the stream-specific modulated binary streams or a second complex-valued stream involves using non-binary FEC encoding with at least one "0" output.

Example receiver/decoder-side operations are also shown by way of example in FIG. 14. A signal that includes a data stream, or multiple data streams, to be decoded is received at 1450. Coded bit likelihood values, such as LLRs, are generated at 1452. This could involve using ML detection, or a message passing algorithm, for example. In another embodiment, generation of likelihood values at 1452 involves demodulation, and calculating a stream of likelihood values by using iterative message passing. Another embodiment involves using non-binary FEC decoding and calculating a stream of coded bit LLRs by using iterative message passing. At 1454, the data stream, or each data stream in the case of multiple data streams, in a received signal is decoded using FEC decoding.

Figure 15:
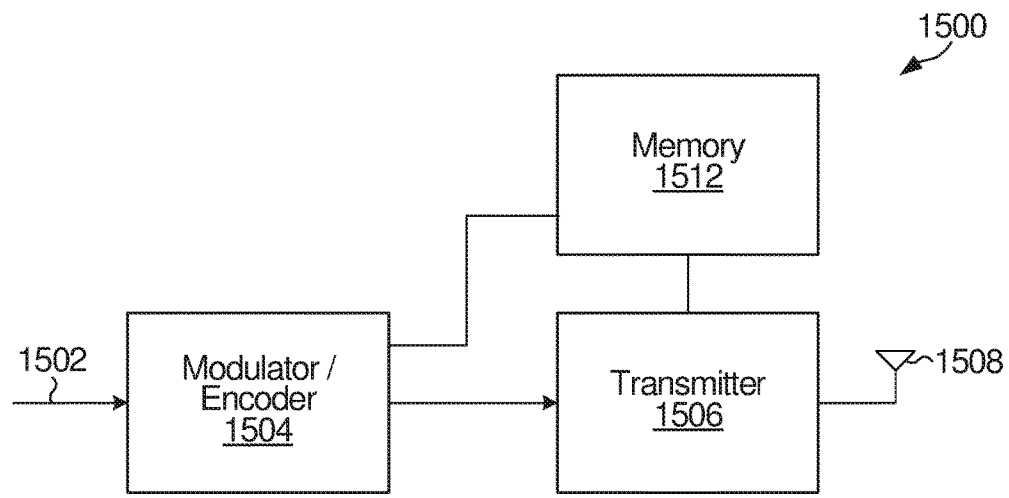
FIG. 15 is a block diagram of an example apparatus in which embodiments could be implemented.

FIG. 15 is a block diagram of an example apparatus in which embodiments could be implemented. The apparatus 1500 includes a modulator/encoder 1504 coupled to an input 1502. The apparatus 1500 also includes a transmitter 1506 coupled to the parity modulator/encoder 1504. In the illustrated embodiment, the apparatus 1500 also includes an antenna 1508, coupled to a transmitter 1506, for transmitting signals over a wireless channel. In some embodiments, the transmitter 1506 includes components of an RF transmit chain. A memory 1512 is also shown in FIG. 15, coupled to the modulator/encoder 1504 and to the transmitter 1506.

In an embodiment, the modulator/encoder 1504 is implemented in circuitry, such as a processor, that is configured to implement features as disclosed herein. The modulator/encoder 1504 could include components as shown in any of FIGS. 1 to 9, for example. In a processor-based implementation of the modulator/encoder 1504, processor-executable instructions to configure a processor to perform operations disclosed herein are stored in a non-transitory processor-readable medium. The non-transitory medium could include, in the memory 1512 for example, one or more solid-state memory devices and/or memory devices with movable and possibly removable storage media.

An apparatus could therefore include a processor, and a memory such as 1512 coupled to the processor, storing instructions which, when executed by the processor, cause the processor to perform a method as disclosed herein.

FIG. 15 generalizes an apparatus that includes a binary FEC encoder to encode a stream of input bits into a stream of coded bits; a bit mapper, coupled to the binary FEC encoder, to map the stream of coded bits to a plurality of binary streams; and a modulator, coupled to the bit mapper, to apply stream-specific modulations to the plurality of binary streams. These components represent one example implementation of the modulator/encoder 1504.

[oils] A bit mapper could be configured to interleave and/or scramble the stream of coded bits. In other embodiments, either or both of interleaving and scrambling could be implemented separately from a bit mapper, in a bit-level interleaver/scrambler as shown in FIG. 1 for example.

In some embodiments, the bit mapper is configured to map coded bits such that at least one coded bit is mapped to more than one of the binary streams and none of binary streams are identical to each other.

The modulator is configured in some embodiments to generate a plurality of first streams comprising complex-valued signals. A non-binary FEC encoder could be coupled to the bit mapper, to encode the plurality of first complex-valued streams into a second complex-valued stream.

Any of the variations described above with reference to encoding, modulation, transmission, and/or related features in FIG. 14 could be applied in an apparatus implementation. For example, the binary streams into which coded bits are mapped by a bit mapper could, but might not necessarily be, disjoint. The bit mapper could be configured to divide the coded bits among the binary streams.

In some embodiments, the binary FEC encoder is configured to apply binary FEC encoding to streams of input bits associated with multiple UEs to generate streams of coded bits. A bit multiplexer could be coupled to the binary FEC encoder, and configured to bit multiplex the streams of coded bits into a bit multiplexed stream of coded bits, with the mapper being configured to map the bit multiplexed stream of coded bits. In another embodiment, a power scaler is operatively coupled to the modulator, or to the non-binary FEC encoder if non-binary FEC encoding is implemented, to multiplex the stream-specific modulated binary streams or the second complex-valued stream using stream-specific power scaling vectors.

The modulator could include a plurality of stream-specific QAM mappers, to apply QAM mapping with Gray or non-Gray labeling. More generally, a modulator could include a plurality of stream-specific modulators, which could be of different orders.

A non-binary FEC encoder could be configured to output the first complex-valued streams as the second complex-valued stream. The non-binary FEC encoder could be configured to instead implement symbol-level spreading in which each of the first complex-valued streams is multiplied by a spreading sequence, or to implement one or both of: symbol-level scrambling in which each of the first complex-valued streams is multiplied by a scrambling sequence, and symbol-level interleaving in which each of the first complex-valued streams is multiplied by an interleaving matrix.

A sparse spreader could be coupled to the modulator to spread the stream-specific modulated binary streams, or a second complex-valued stream from non-binary FEC encoding, using a sparse spreading vector. Such spreading involves spreading symbols that are generated from the binary streams by the stream-specific modulations, or FEC-encoded symbols if non-binary FEC encoding is applied.

A non-binary FEC encoder coupled to the modulator, or a further non-binary FEC encoder coupled to another non-binary FEC encoder, could be configured to spread the stream-specific modulated binary streams, or the second complex-valued stream, using non-binary FEC encoding with at least one "o" output.

Figure 16:
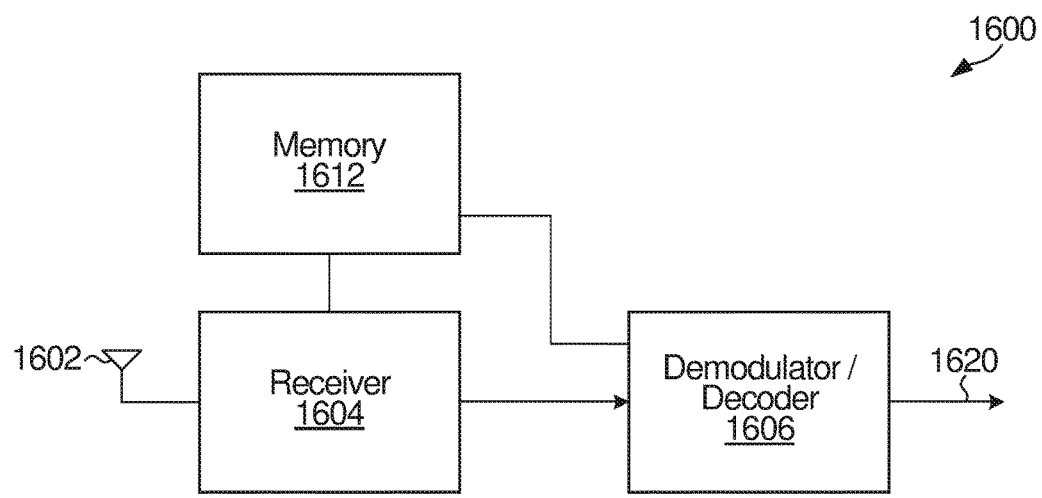
FIG. 16 is a block diagram of another example apparatus in which embodiments could be implemented.

FIG. 16 is a block diagram of another example apparatus in which embodiments could be implemented. The apparatus 1600 includes a receiver 1604 coupled to an antenna 1602 for receiving signals from a wireless channel, and to a demodulator/decoder 1606. A memory 1612 is also shown in FIG. 16, coupled to receiver 1604 and to the demodulator/decoder 1614.

In some embodiments, the receiver 1604 includes components of an RF receive chain. The receiver 1604 receives, via the antenna 1602, signals that include data streams that are to be decoded. The demodulator/decoder 1606 is configured to implement receiver decoder-side features as disclosed herein. Decoded bits are output at 1620 for further receiver processing.

In some embodiments, the apparatus 1600, and similarly the apparatus 1500 in FIG. 15 as noted above, include a non-transitory computer readable medium at 1512, 1612 that includes instructions for execution by a processor to implement and/or control operation of the modulator/encoder 1504 in FIG. 15, to implement and/or control operation of the and the demodulator/decoder 1606 in FIG. 16, and/or to otherwise control the execution of methods described herein. In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which could be, for example, a compact disc read-only memory (CD-ROM), universal serial bus (USB) flash disk, or a removable hard disk, at 1512, 1612.

In an embodiment, the demodulator/decoder 1606 is implemented in circuitry that is configured to implement features as disclosed herein. The demodulator/decoder 1606 could include components as shown in any of FIGS. 10 to 13, for example. The receiver 1604 and/or the demodulator/decoder 1606 could be fully or partially implemented in software or modules stored in the memory 1612 and executed by a processor(s) of the apparatus 1600.

An apparatus could therefore include a processor, and a memory such as 1612 coupled to the processor, storing instructions which, when executed by the processor, cause the processor to perform a method as disclosed herein, or receiving/decoding operations corresponding to transmitting/encoding operations disclosed herein.

FIG. 16 generalizes an apparatus that includes a receiver to receive a signal comprising a data stream, or multiple data streams, to be decoded; a signal detector, coupled to the receiver, to generate coded bit likelihood values such as LLRs; and a FEC decoder, coupled to the signal detector, to decode the data stream, or each data stream, in a received signal. The signal detector could be configured to generate coded bit likelihood values using one of: ML detection, a message passing algorithm, a combination of demodulation and iterative message passing, and a combination of non-binary forward error correcting (FEC) decoding and iterative message passing, for example.

Communication equipment could include the apparatus 1500, the apparatus 1600, or both a transmitter and a receiver and both a modulator/encoder and a demodulator/decoder as described above. Such communication equipment could be user equipment or communication network equipment.

Figure 17:
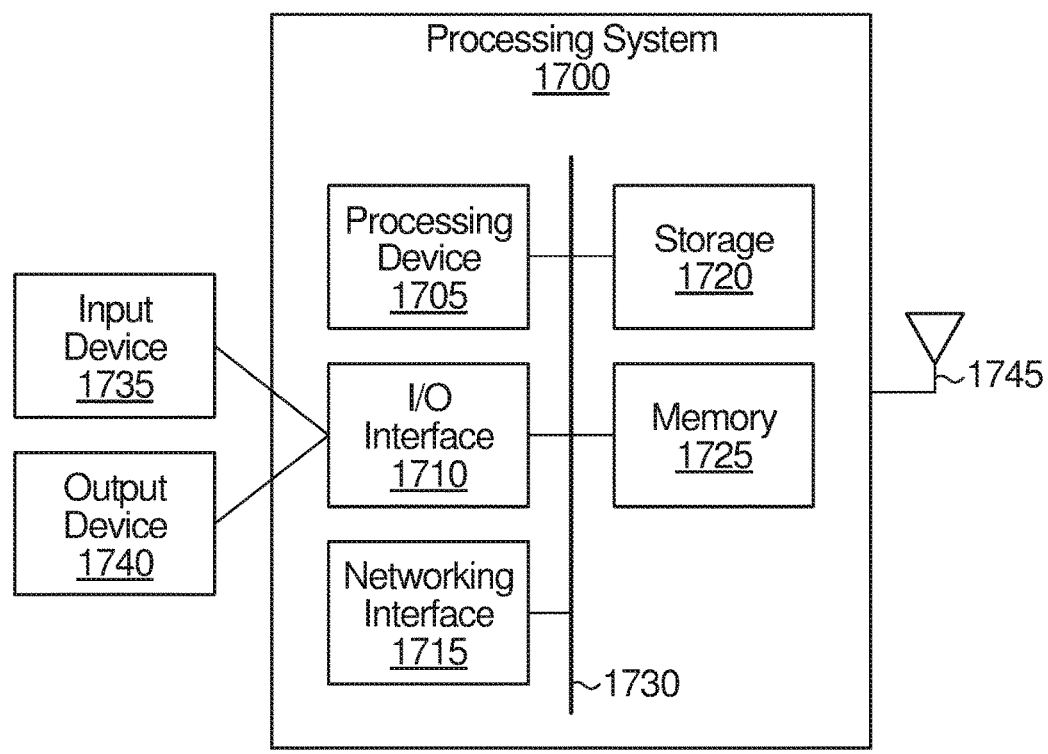
FIG. 17 is a block diagram of an example processing system, which may be used to implement embodiments disclosed herein.

FIGS. 15 and 16 are generalized block diagrams of apparatus that could be used to implement embodiments disclosed herein. FIG. 17 is a block diagram of an example processing system which provides a higher level implementation example and which may be used to implement embodiments disclosed herein.

The apparatus 1500, the apparatus 1600, or both, may be implemented using the example processing system 1700, or variations of the processing system 1700. The processing system 1700 could be a radio access node or a wireless device, for example, or any suitable processing system. Other processing systems suitable for implementing embodiments described in the present disclosure may be used, which may include components different from those discussed below. Although FIG. 17 shows a single instance of each component, there may be multiple instances of each component in the processing system 1700.

The processing system 1700 may include one or more processing devices 1705, such as a processor, a microprocessor, an application-specific integrated circuit (ASIC), a field-programmable gate array (FPGA), a dedicated logic circuitry, or combinations thereof. The processing system 1700 may also include one or more input/output (I/O) interfaces 1710, which may enable interfacing with one or more appropriate input devices 1735 and/or output devices 1740. The processing system 1700 may include one or more network interfaces 1715 for wired or wireless communication with a network (e.g., an intranet, the Internet, a P2P network, a WAN and/or a LAN) or other node. The network interfaces 1715 may include wired links (e.g., Ethernet cable) and/or wireless links (e.g., one or more antennas) for intra-network and/or inter-network communications. The network interfaces 1715 may provide wireless communication via one or more transmitters or transmit antennas and one or more receivers or receive antennas, for example. In this example, a single antenna 1745 is shown, which may serve as both transmitter and receiver. However, in other examples there may be separate antennas for transmitting and receiving. The processing system 1700 may also include one or more storage units 1720, which may include a mass storage unit such as a solid state drive, a hard disk drive, a magnetic disk drive and/or an optical disk drive.

The processing system 1700 may include one or more memories 1725, which may include a volatile or non-volatile memory (e.g., a flash memory, a random access memory (RAM), and/or a read-only memory (ROM)). The non-transitory memories 1725 may store instructions for execution by the processing devices 1705, such as to carry out examples described in the present disclosure. The memories 1725 may include other software instructions, such as for implementing an operating system and other applications/functions. In some examples, one or more data sets and/or modules may be provided by an external memory (e.g., an external drive in wired or wireless communication with the processing system 1700) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 1730 providing communication among components of the processing system 1700. The bus 1730 may be any suitable bus architecture including, for example, a memory bus, a peripheral bus or a video bus. In FIG. 17, the input devices 1735 (e.g., a keyboard, a mouse, a microphone, a touchscreen, and/or a keypad) and output devices 1740 (e.g., a display, a speaker and/or a printer) are shown as external to the processing system 1700. In other examples, one or more of the input devices 1735 and/or the output devices 1740 may be included as a component of the processing system 1700.

Figure 18:
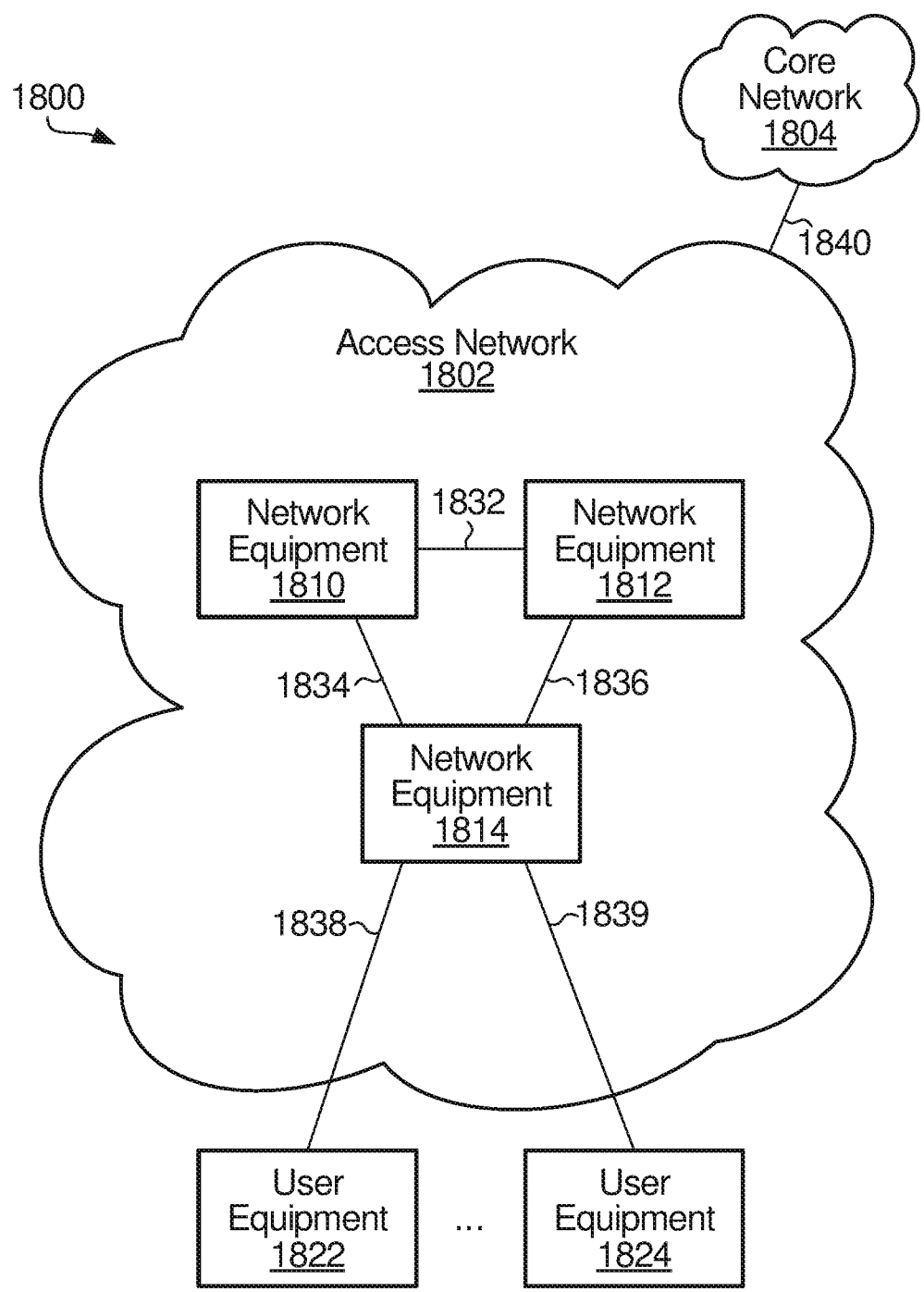
FIG. 18 is a block diagram of an example communication system.

FIG. 18 is a block diagram of an example communication system in which embodiments of the present disclosure could be implemented. The example communication system 1800 in FIG. 18 includes a Core Network (CN) 1804 and an access network (e.g. Radio Access Network (RAN)) 1802. The access network 1802 includes network equipment 1810, 1812, 1814 that implements the access methods described above to provide UEs 1822, 1824 with access to networks and/or services available via the core network 1804. The UEs 1822, 1824 are configured to transmit and/or receive data to and/or from the network equipment 1814 via wireless communication links 1838, 1939. Each user equipment 1822, 1824 represents any suitable end user device and may include (or be referred to as) an Electronic Device (ED), wireless device, Wireless Transmit/Receive Unit (WTRU), Machine Type Communication (MTC) device, station (STA), mobile station, fixed or mobile subscriber unit, cellular telephone, personal digital assistant (PDA), smartphone, laptop, computer, touchpad, wireless sensor, or other consumer electronics device.

In the communication system 1800, the access network 1802 communicates with the core network 1804 over another network communication link 1840. The core network 1804, like the access network 1802, may include network equipment that communicates with one or more installations of the network equipment 1810, 1812, 1814 in the access network 1802. However, in a communication system with an access network 1802 and a core network 1804, the core network might not itself directly provide communication service to user equipment.

The communication system 1800 is intended solely as an illustrative example. An access network 1802 could include more or fewer than three installations of network equipment, for example, which might or might not all directly communicate with each other as shown. Also, more than one installation of network equipment in the access network 1802 could provide communication service to user equipment. There could be more than one access network 1802 coupled to a core network 1804. It should also be appreciated that the present disclosure is not in any way limited to communication systems having an access network/core network structure.

Considering the access network 1802, any of various implementations are possible. The exact structure of network equipment 1810, 1812, 1814, and user equipment 1822, 1824 for which such network equipment provides communication service, is implementation-dependent. The apparatus 1500, 1600, and 1700 in FIGS. 15 to 17 are examples of communication equipment that could be implemented at user equipment 1822, 1824 and/or network equipment 1810, 1812, and 1814.

At least the network equipment 1814 that provides communication service to the user equipment 1822, 1824 includes a physical interface and communications circuitry to support communications with the user equipment over the links 1838, 1839. The physical interface could be in the form of an antenna or an antenna array, for example, where the access communication links 1838, 1839 are wireless links. Multiple interfaces could be provided at the network equipment 1814 to support multiple access communication links 1838, 1839 of the same type or different types, for instance. The type of communications circuitry coupled to the physical interface or interfaces at the access network equipment 1814 is dependent upon the type or types of access communication links 1838, 1839 and the communication protocol or protocols used to communicate with the user equipment 1822, 1824.

The network equipment 1810, 1812, 1814 also includes a physical interface, or possibly multiple physical interfaces, and communications circuitry to enable communications with other network equipment in the access network 1802. At least some installations of network equipment 1810, 1812, and 1814 also include one or more physical interfaces and communications circuitry to enable communications with core network equipment over the communication link 1840. There could be multiple communication links between network equipment 1810, 1812, 1814 and the core network 1804. Communication links 1832, 1834, 1836 in the access network 1802, and the communication link 1840 to the core network 1804, could be the same type of communication link. In this case the same type of physical interface and the same communications circuitry at the network equipment 1810, 1812, and 1814 could support communications between access network equipment within the access network 1802 and between the access network 1802 and the core network 1804. Different physical interfaces and communications circuitry could instead be provided at the network equipment 1810, 1812, 1814 for communications within the access network 1802 and between the access network 1802 and the core network 1804.

In the communication system 1400, the network equipment 1814 (and network equipment 1810, 1812 if used for network access) is configured to wirelessly communicate with one or more user equipment 1822, 1824, to enable access to the core network 1804 and/or other networks or services available via the core network 1804. The network equipment 1814 (and possibly 1810, 1812) may include (or be) one or more of several well-known devices, such as a base station, a base transceiver station (BTS), a radio access node, a Node-B (NodeB or NB), an evolved NodeB (eNodeB), a gNodeB (sometimes called a "gigabit" NodeB), a Home NodeB (e.g. a Home eNB/gNB), a Transmission Point (TP), a site controller, an access point (AP), or a wireless router. The network equipment 1814 operates to transmit and/or receive wireless signals within a particular geographic region or area, sometimes referred to as a "cell." In some embodiments, multiple-input multiple-output (MIMO) technology may be employed having multiple transceivers for each cell. In some embodiments, the term network equipment may also refer to modules on the network side configured to perform certain processing operations and which are not necessarily part of the equipment housing the network equipment transceiver. In other embodiments, the network equipment 1814 (and possibly 1810, 1812) may actually be a plurality of base stations or TPs that are operating together to serve the user equipment 1822, 1824, e.g. with multi-point transmissions.

Network equipment in the core network 1804 could be similar in structure to the network equipment 1810, 1812, 1814. However, as noted above, network equipment in the core network 1804 might not directly provide communication service to user equipment and therefore might not include physical interfaces for access communication links or associated communications circuitry. Physical interfaces and communications circuitry at network equipment in the core network 1804 could support the same type or types of network communication link or links as in the access network 1802, different type or types of network communication link or links, or both.

Just as the exact structure of physical interfaces at network equipment 1810, 1812, 1814 and network equipment in the core network 1804 is implementation-dependent, the associated communications circuitry is implementation-dependent as well. In general, hardware, firmware, components which execute software, or some combination thereof, might be used in implementing such communications circuitry. Examples of electronic devices that might be suitable for implementing communications circuitry are provided above.

Each installation of user equipment 1822, 1824 includes a physical interface and communications circuitry compatible with a physical interface and communications circuitry at the network equipment 1814, to enable the user equipment to communicate with the network equipment. Multiple physical interfaces of the same or different types could be provided at the user equipment 1822, 1824. The user equipment 1822, 1824 could also include such components as input/output devices through which functions of the user equipment are made available to a user. In the case of a wireless communication device such as a smartphone, for example, these functions could include not only communication functions, but other local functions which need not involve communications. Different types of user equipment 1822, 1824, such as different smartphones for instance, could be serviced by the same network equipment 1814.

Any of the communication links 1832, 1834, 1836, 1838, 1839, 1840, and communication links in the core network 1804 could potentially be or include wireless communication links. Such communication links tend to be used more often within an access network 1802 than in a core network 1804, although wireless communication links at the core network level are possible.

The previous description of some embodiments is provided to enable any person skilled in the art to make or use an apparatus, method, or processor readable medium according to the present disclosure.

Various modifications to the embodiments described herein may be readily apparent to those skilled in the aft, and the generic principles of the methods and devices described herein may be applied to other embodiments. Thus, the present disclosure is not intended to be limited to the embodiments shown herein but is to be accorded the widest scope consistent with the principles and novel features disclosed herein.

What has been described is merely illustrative of the application of principles of embodiments of the present disclosure. Other arrangements and methods can be implemented by those skilled in the art.

For example, transmitter apparatus and method features could be implemented in communication network equipment such as base transceiver stations for downlink communications, and/or in UEs for uplink communications. Similarly, receiver features could be implemented in UEs and/or in network equipment. The components illustrated in the apparatus drawings could be implemented using hardware, firmware, components which execute software, or some combination thereof. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Transmitters and receivers could perform other operations in addition to those described herein, depending on the specific implementation and the types of communication functions and protocols to be supported.

The contents of the drawings are intended solely for illustrative purposes, and the present invention is in no way limited to the particular example embodiments explicitly shown in the drawings and described herein. For example, components such as stream-specific modulators need not necessarily be implemented in separate and distinct physical components, but could instead be implemented in a single modulator. Similarly, FEC decoders need not be implemented in separate physical components.

In addition, although described primarily in the context of methods and systems, other implementations are also contemplated, as instructions stored on a non-transitory processor-readable medium, for example. A non-transitory processor-readable medium could store instructions which, when executed by one or more processors, cause the one or more processors to perform a method as disclosed herein.

What is claimed is:

1. A method comprising:
   applying binary forward error correcting (FEC) encoding to a stream of input bits to generate a stream of coded bits;
   mapping the stream of coded bits to a plurality of binary streams such that at least one coded bit is mapped to more than one of the binary streams and none of the binary streams are identical to each other; and
   applying stream-specific modulations to the plurality of binary streams.

2. The method of claim 1, further comprising:
   sparsely spreading, using a sparse spreading vector, symbols that are generated from the binary streams by the stream-specific modulations.

3. The method of claim 1, wherein applying binary FEC encoding comprises applying binary FEC encoding to streams of input bits associated with multiple user equipments (UEs) to generate streams of coded bits, wherein mapping comprises mapping the streams of coded bits, and wherein the method further comprises:
   multiplexing, using stream-specific power scaling vectors, symbols that are generated from the binary streams by the stream-specific modulations.

4. The method of claim 1, wherein the stream-specific modulations comprise quadrature amplitude modulation (QAM) mapping.

5. The method of claim 1, wherein the stream-specific modulations comprise stream-specific modulations of different orders.

6. A method comprising:
   applying binary forward error correcting (FEC) encoding to a stream of input bits to generate a stream of coded bits;
   mapping the stream of coded bits to a plurality of binary streams;
   applying stream-specific modulations to the plurality of binary streams to generate a plurality of first streams comprising complex-valued signals; and
   applying to the plurality of first streams, at least one of symbol-level spreading, symbol-level scrambling, and symbol-level interleaving, to generate a second complex-valued stream.

7. The method of claim 6, wherein applying the symbol-level spreading comprises multiplying each of the plurality of first streams by a spreading sequence.

8. The method of claim 6, wherein applying the symbol-level scrambling comprises multiplying each of the plurality of first streams by a scrambling sequence.

9. The method of claim 6, wherein applying the symbol-level interleaving comprises multiplying each of the plurality of first streams by an interleaving matrix.

10. The method of claim 6, wherein applying the binary FEC encoding comprises applying binary FEC encoding to streams of input bits associated with multiple UEs to generate streams of coded bits, wherein mapping comprises mapping the streams of coded bits, and wherein the method further comprises:
    multiplexing the second complex-valued stream using stream-specific power scaling vectors.

11. A device comprising:
    a non-transitory memory storage comprising instructions; and
    one or more processors in communication with the non-transitory memory storage, wherein the one or more processors execute the instructions to:
    apply binary forward error correcting (FEC) encoding to a stream of input bits to generate a stream of coded bits;
    map the stream of coded bits to a plurality of binary streams such that at least one coded bit is mapped to more than one of the binary streams and none of the binary streams are identical to each other; and
    apply stream-specific modulations to the plurality of binary streams.

12. The device of claim 11, wherein the one or more processors further execute the instructions to:
    sparsely spread, using a sparse spreading vector, symbols that are generated from the binary streams by the stream-specific modulations.

13. The device of claim 11, wherein the instructions to apply binary FEC encoding comprises instructions to apply binary FEC encoding to streams of input bits associated with multiple user equipments (UEs) to generate streams of coded bits, wherein mapping comprises mapping the streams of coded bits, and wherein the one or more processors further execute the instructions to:
    multiplex, using stream-specific power scaling vectors, symbols that are generated from the binary streams by the stream-specific modulations.

14. The device of claim 11, wherein the stream-specific modulations comprise quadrature amplitude modulation (QAM) mapping.

15. The device of claim 11, wherein the stream-specific modulations comprise stream-specific modulations of different orders.

16. A device comprising:
    a non-transitory memory storage comprising instructions; and
    one or more processors in communication with the non-transitory memory storage, wherein the one or more processors execute the instructions to:
    apply binary forward error correcting (FEC) encoding to a stream of input bits to generate a stream of coded bits;
    map the stream of coded bits to a plurality of binary streams;
    apply stream-specific modulations to the plurality of binary streams to generate a plurality of first streams comprising complex-valued signals; and
    apply to the plurality of first streams, at least one of symbol-level spreading, symbol-level scrambling, and symbol-level interleaving, to generate a second complex-valued stream.

17. The device of claim 16, wherein the instructions to apply the symbol-level spreading comprises instructions to multiply each of the plurality of first streams by a spreading sequence.

18. The device of claim 16, wherein the instructions to apply the symbol-level scrambling comprises instructions to multiply each of the plurality of first streams by a scrambling sequence.

19. The device of claim 16, wherein the instructions to apply the symbol-level interleaving comprises instructions to multiply each of the plurality of first streams by an interleaving matrix.

20. The device of claim 16, wherein the instructions to apply the binary FEC encoding comprises instructions to applying binary FEC encoding to streams of input bits associated with multiple UEs to generate streams of coded bits, wherein mapping comprises mapping the streams of coded bits, and wherein the one or more processors further execute the instructions to:
- multiplex the second complex-valued stream using stream-specific power scaling vectors.

* * * * *